June 2, 1936. L. J. DE LANTY Re. 19,991

RAIL FLAW DETECTOR CAR

Original Filed Nov. 4, 1933

Inventor

LOREN J. DE LANTY

By Joseph N. Lipschutz

Attorney

Reissued June 2, 1936

Re. 19,991

UNITED STATES PATENT OFFICE 19,991

RAIL FLAW DETECTOR CAR

Loren J. DeLanty, Brooklyn, N. Y., assignor to Sperry Products, Inc., Brooklyn, N. Y., a corporation of New York Original No. 2,027,814, dated January 14, 1936, Serial No. 696,660, November 4, 1933. Application for reissue March 24, 1936, Serial No. 70,707

13 Claims. (Cl. 175—183)

This invention relates to rail flaw detector mechanisms of the type employed in the Sperry rail flaw detector cars. As is now well known, said Sperry rail flaw detector mechanism operates on the principle of sending current through the rail to establish an electromagnetic field surrounding the same and then detecting any variations in the said electromagnetic field by means of induction coils which will respond to any variations in flux caused by regions of flaw.

Since in passing over rail joints the irregularities in the current path set up by the joint-bars, bolts, etc. cause distortion of the electromagnetic field, such regions of electromagnetic flux distortion would be picked up by the induction means in the same manner as an internal fissure within the rail. In order to avoid picking up these indications at every rail joint there are provided joint cutout mechanisms, such as shown in the patent to H. C. Drake, No. 1,912,569 granted June 6, 1933, which cutout mechanisms operate to cause the flaw indicating means to be rendered ineffective as long as the induction means is passing over a joint and which also operate a joint-indicating mechanism at the same time.

It is the principal object of my invention to provide another form of joint-cutout mechanism operating on an entirely different principle from that heretofore employed.

Further objects and advantages of my invention will become apparent in the following detailed description.

In the accompanying drawing.

Figure 1:
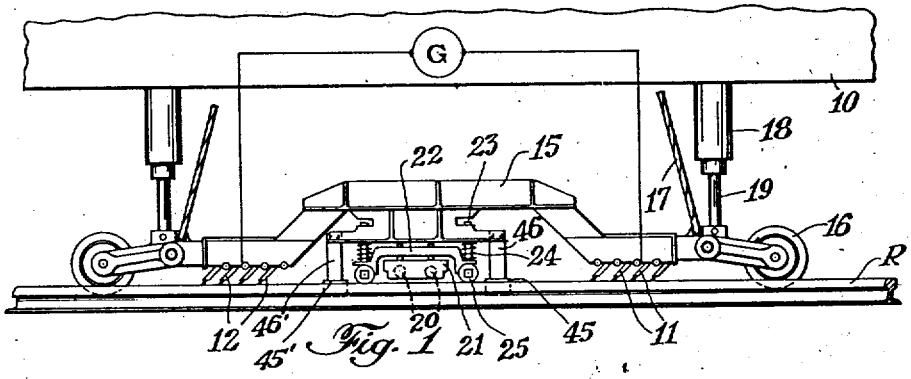
Fig. 1 is a side view of a portion of a Sperry rail flaw detector mechanism showing my invention applied thereto.

Referring first to Fig. 1 of the drawing, there is illustrated a portion of the car body 10 of a Sperry rail flaw detector car. Within the car body is positioned a generator G which is designed to supply current to the rail by means of sets of brushes 11, 12 carried by a current brush carriage 15. Said current brush carriage may be supported on the rail by means such as flanged wheels 16 and said carriage is normally held in raised position out of engagement with the rail by means such as retractile springs (not shown) and cables 17. To lower the current brush carriage to effective position in engagement with the rail there may be supplied fluid pressure cylinders 18 to which fluid pressure is adapted to be supplied to depress pistons having piston rods 19 connected to the current brush carriage.

The current sent through the rail from generator G by way of brushes 11, 12 establishes an electromagnetic field surrounding the rail R and said field will be uniform in flux intensity along the rail as long as no flaw is located therein. When a flaw is located within the rail the electromagnetic field is distorted. Such distortion is detected by means of induction coils 20 which may be housed in a suitable housing 21 and supported on a detector carriage 22 which is in turn supported on the current brush carriage by means such as a loosely fitting bolt 23 and springs 24, constituting limited universal joints which permit the detector carriage to move independently of the current brush carriage. The detector carriage may be supported on the rail by means such as rollers 25.

It will now be seen that as the car travels along the rails the detector coils 20 will cut a constant number of lines of force but that as soon as a region of flaw is encountered one of said coils will cut a different number of lines of force and a differential E. M. F. will be generated. Fluctuations in the current supply will have no effect upon the inductive means 20 because said means comprises a pair of coils of equal inductive effect and oppositely connected, so that fluctuations in the current supply affect both coils equally, oppositely, and simultaneously.

Figure 2:
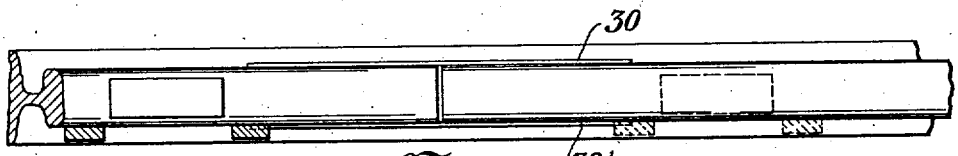
Fig. 2 is a plan view of a rail at the joint, showing substantially the effective operating range of the joint-cutout mechanism.
Figure 3:
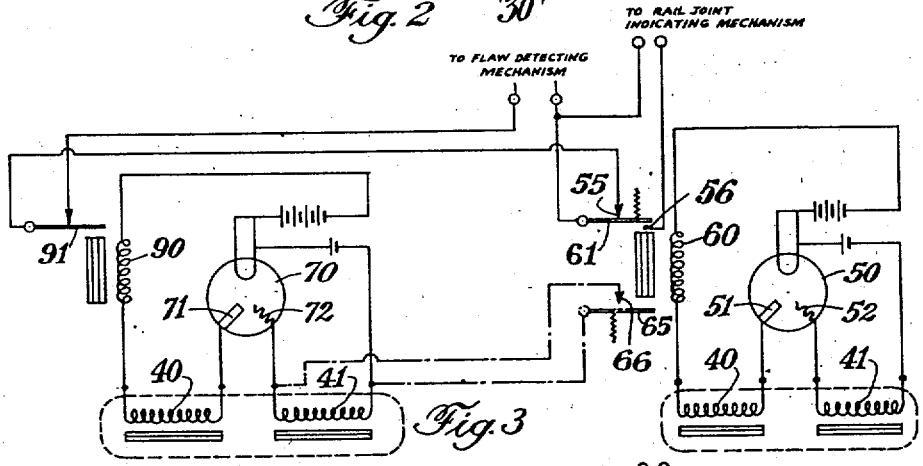
Fig. 3 is a wiring diagram illustrating the principle embodied in my invention.
Figure 4:
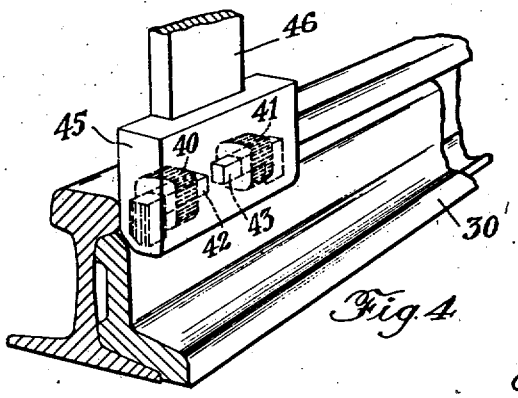
Fig. 4 is a perspective view showing one of my joint-cutout members in operative position with respect to a rail joint.
Figure 5:
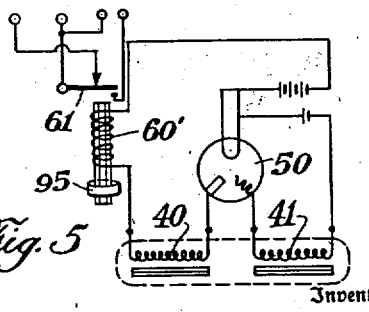
Fig. 5 is a view similar to Fig. 3 but showing a modified form of the invention.

When the detector mechanism 20 reaches a rail joint it obviously reaches a region of electromagnetic distortion, since such joint, as shown in Figs. 2 and 4, comprises joint bars 30 as well as bolts and other mechanisms, not shown. Such electromagnetic distortion ordinarily would be picked up by the detector mechanism 20 and would actuate an indicator in a similar manner as would a flaw. Thus, at every rail joint a series of indications would come through caused by the irregularities in the electromagnetic flux introduced by the rail joint mechanism. To obviate this condition, Sperry cars have been equipped with joint cutout fingers as shown in the said patent to Drake No. 1,912,569, which fingers slide along the side of the rail and engage the joint-bars to actuate the fingers and close circuits which serve to do two things. First, they open the circuit to indicating mechanism so that the indicating mechanism will be rendered ineffective during the passage of the detector mechanism over the rail joint, and, secondly, they close the circuit through a rail joint-indicating mechanism to give an indication of the occurrence of a joint. It will be apparent from the said patent that the form of joint cutout therein employed called for mechanical engagement of moving members with the joint-bars and this introduced certain difficulties in operation which it is one purpose of my invention to overcome. For example, the fingers had to be adjusted for various types of joint-bars some of which projected beyond the rail to a different degree from others. Also, various projections on the rail, such as detached portions, sometimes operated the fingers. I have therefore provided for a non-contacting joint-cutout mechanism which will not engage the joint-bar and hence will be free of the operating difficulties which have been experienced with the contacting type of joint cutout.

My invention embodies a magnetic circuit which normally has an air gap and which air gap is designed to be partially occupied by the joint-bar of a rail joint. Thus, for instance, in Fig. 4, I have shown two induction coils 40, 41 in magnetically coupled relation. Said coupling may include opposed L-shaped cores 42 and 43 to form three sides of a circuit, the fourth side joining the bases of the coils being normally an air gap. The coils 40 and 41 are housed in a suitable housing 45 which may be suspended from the detector carriage by supports 46, so that said coils normally are positioned adjacent the side of the rail. On approaching a joint, the joint-bar will be in position to furnish the closing side of the magnetic circuit, thus reducing the air gap.

Since the metal of the joint-bar furnishes a path of higher magnetic permeability for the magnetic flux, the reluctance of the magnetic circuit is reduced, and I utilize the said reduction in reluctance to open the circuit of the indicating mechanism and to close the circuit to the rail joint mechanism. For this purpose, I make the magnetic circuit a part of an oscillatory circuit so that when the reluctance of the magnetic circuit is reduced by the presence of a joint-bar, more energy will be fed back into the oscillatory circuit, thus increasing the current in the plate circuit of a vacuum tube 50 of the oscillatory circuit. The E. M. F. generated in the coils connected to the oscillator may be utilized as the starting impulse for initiating oscillation. The output from the plate 51 of the tube 50 is fed back through the magnetic circuit, including coils 40 and 41, into the grid 52 of said tube to set up the oscillation. Increase of the current in the plate circuit of the vacuum tube, as by the average value of oscillation, will increase the current flowing through a relay 30 in the plate circuit, which relay will then attract its armatures 61, 65 to open the circuit to the flaw indicating mechanism at 55 and to close the circuit to the rail joint indicating mechanism at contact 56.

Since the coils in housing 45 will have passed beyond the joint-bars 30, as shown in dotted lines in Fig. 2, before the detector mechanism 20 has passed beyond said joint-bars, it is necessary to provide some means for continuing to render the flaw indicating mechanism ineffective until the detector mechanism 20 has passed beyond the angle-bars. For this purpose, I provide a duplicate mechanism 45′ supported on the detector carriage by support 46′ at the rear of the detector mechanism, whereas the housing 45 is positioned the required distance in advance of said mechanism. When relay 60 is energized due to the fact that coils 40 and 41 have reached the joint-bar, said relay not only renders the flaw indicating mechanism ineffective but also attracts an armature 65 to close a circuit at 66 which short-circuits the grid 72 of a vacuum tube 70 and thus prevents the rear tube 70 from setting up an oscillatory circuit. As soon as the forward coils in housing 45 have passed beyond the angle-bar a predetermined distance, the average current through relay 60 is reduced, the armature 65 is released, and the short-circuit through grid 72 is broken to permit an oscillatory circuit to be set up through tube 70. Within the rear housing 45′ are two induction units 40 and 41 similar to those in the forward housing and similarly positioned with respect to the angle-bar. They are also connected in the oscillatory circuit between the plate 71 and grid 72 of tube 70 so that when the oscillatory circuit through vacuum tube 70 is allowed to be set up by the release of armature 65, relay 90 will be energized to attract armature 91 to keep the flaw indicating mechanism ineffectitve until the housing 45′ has passed beyond the joint-bars by the required distance. The coils of the first circuit are placed ahead of the search unit so as to cut out the pens a predetermined distance before the search unit reaches the joint-bar. When the coils of the first circuit leave the joint-bar the search unit is still on the joint-bar but by this time the second oscillatory circuit has reached the joint-bar and therefore the flow indicating mechanism continues to be ineffective until the search unit comprising the coils 20 has passed a predetermined distance beyond the joint-bar.

Instead of providing a second housing 45′ with a second oscillatory circuit including another pair of magnetically coupled coils, I may provide only the first oscillatory circuit and the first housing 45 in advance of the search coils. However, since as explained above, the housing 45 will have passed beyond the joint-bars when the search unit is still over said bars, and it is not desired to have the flaw indicating mechanism rendered effective until the search unit has passed beyond the joint-bars, I may substitute for the relay 60 a delayed-action relay 60′ which, in spite of the fact that the housing 45 has passed beyond the joint-bars to reduce the current in the oscillatory circuit, will remain energized by reason of the fact that it is of the delayed-action type and this will keep armature 61 attracted for a sufficient length of time to insure that the search unit has passed beyond the joint-bars. The delayed-action relay may be of the type having a band of copper 95 surrounding it which introduces the lag in de-energizing but which permits the relay to be quickly energized.

The pairs of coils 40, 41 being arranged with their axes parallel to the axis of current will not be affected by current surges through the rail. This is true even where the axis of current becomes distorted because any inductive effect on one coil is counteracted by the simultaneous effect on the other coil acting on the plate and grid of the oscillator tube.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising an oscillatory circuit and means whereby said circuit is varied by said joint-bars.

2. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising an oscillatory circuit including a magnetic circuit and means whereby said joint-bars change the reluctance of said magnetic circuit.

3. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising an oscillatory circuit including an oscillating tube having a feed-back from the plate to the grid, a magnetic circuit connected between the plate and grid of said tube, and means whereby said joint-bars change the reluctance of said magnetic circuit to vary said feed-back.

4. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising an oscillatory circuit including a normally open magnetic circuit, said joint-bars being adapted to complete said magnetic circuit to change the reluctance thereof.

5. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising an oscillatory circuit normally out of oscillation and means whereby said circuit is set into oscillation when said responsive means is in cooperative relation with said joint-bars.

6. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising a pair of oscillatory circuits in advance and to the rear of said responsive means, and means whereby each of said circuits is varied by said joint-bars, said circuits being positioned so that said rear circuit cooperates with said joint-bars when said forward circuit has passed beyond said joint-bars.

7. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising a pair of oscillatory circuits in advance and to the rear of said responsive means, means whereby each of said circuits is varied by said joint-bars, said circuits being positioned so that said rear circuit cooperates with said joint-bars when said forward circuit has passed beyond said joint-bars, and means whereby said forward circuit when cooperating with said joint-bars renders said rear circuit ineffective.

8. In a rail flaw detector mechanism, means responsive to flaws, an indicator, means whereby said indicator is actuated by said responsive means, the rails being joined by joint-bars, and means for rendering said actuating means ineffective when said responsive means passes over a rail joint, said last-named means comprising a pair of oscillatory circuits in advance and to the rear of said responsive means, means whereby each of said circuits is varied by said joint-bars, said circuits being positioned so that said rear circuit cooperates with said joint-bars when said forward circuit has passed beyond said joint-bars, and means rendered effective by variations in said oscillatory circuit for rendering said actuating means ineffective.

9. In a rail flaw detector mechanism, means responsive to flaws, an indicator, means including an electric circuit whereby said indicator is actuated by said responsive means, the rails being joined by joint-bars, and means for rendering said actuating means ineffective when said responsive means passes over a rail joint, said last-named means comprising an oscillatory circuit, means whereby said oscillatory circuit is varied by said joint-bars, and means rendered effective by variations in said oscillatory circuit for breaking the electric circuit of said indicator-actuating means.

10. In a rail flaw detector mechanism, means responsive to flaws, an indicator, means including an electric circuit whereby said indicator is actuated by said responsive means, the rails being joined by joint-bars, and means for rendering said actuating means ineffective when said responsive means passes over a rail joint, said last-named means comprising an oscillatory circuit, means whereby said oscillatory circuit is varied by said joint-bars, and a relay rendered effective by variations in said oscillatory circuit for breaking the electric circuit of said indicator-actuating means.

11. In a rail flaw detector mechanism, means responsive to flaws, an indicator, means including an electric circuit whereby said indicator is actuated by said responsive means, the rails being joined by joint-bars, and means for rendering said actuating means ineffective when said responsive means passes over a rail joint, said last-named means comprising an oscillatory circuit positioned in advance of said responsive means, means whereby said oscillatory circuit is varied by said joint-bars, and a delayed action relay rendered effective by variations in said oscillatory circuit of said indicator-actuating means for maintaining said circuit open until said responsive means has passed beyond said joint-bars.

12. In a rail flaw detector mechanism, means responsive to flaws, an indicator, means whereby said indicator is actuated by said responsive means, the rails being joined by joint-bars, means positioned in advance of said responsive means and adapted to cooperate with said joint-bars, and means whereby said cooperative means when in cooperative relation with a joint-bar renders said indicator-actuating means ineffective, said last-named means including delayed action means for maintaining said indicator-actuating means ineffective after said cooperative means has passed out of cooperative relation with the respective joint-bar and until said responsive means has passed beyond said joint-bar.

13. In a rail flaw detector mechanism, means responsive to flaws, an indicator, means including an electric circuit whereby said indicator is actuated by said responsive means, the rails being joined by joint-bars, means positioned in advance of said responsive means and adapted to cooperate with said joint-bars, and means whereby said cooperative means when in cooperative relation with a joint-bar renders said circuit ineffective, said last-named means including a delayed action relay for maintaining said circuit ineffective after said cooperative means has passed out of cooperative relation with the respective joint-bar and until said responsive means has passed beyond said joint-bar.

LOREN J. DELANTY.